United States Patent
Doyle, Jr.

[15] 3,676,479
[45] July 11, 1972

[54] METHOD OF MANUFACTURING ALLYL N,N-DIALKYLTHIOLCARBAMATES

[72] Inventor: William C. Doyle, Jr., Leawood, Kans.

[73] Assignee: Gulf Research & Development Company, Pittsburgh, Pa.

[22] Filed: Nov. 10, 1969

[21] Appl. No.: 875,581

Related U.S. Application Data

[63] Continuation-in-part of Ser. No. 625,603, March 4, 1967, Pat. No. 3,510,290.

[52] U.S. Cl. ............260/455 A, 260/326.82, 260/327 E, 71/95, 71/100, 424/274, 424/300
[51] Int. Cl. .....................................................C07c 155/08
[58] Field of Search ............260/455 A, 327 E; 71/100, 101, 71/90

[56] References Cited

UNITED STATES PATENTS

| | | | |
|---|---|---|---|
| 3,364,231 | 1/1968 | Levy | 260/455 A |
| 3,407,222 | 10/1968 | Lies | 260/455 A |
| 2,094,914 | 10/1937 | Dachlauer et al. | 260/327 |
| 3,330,643 | 7/1967 | Harman et al. | 260/455 A |
| 3,305,576 | 2/1967 | D'Amico et al. | 260/455 A |
| 3,532,488 | 10/1970 | Husted et al. | 260/455 A |
| 3,101,263 | 8/1963 | Tilles et al. | 71/100 |

FOREIGN PATENTS OR APPLICATIONS

| | | | |
|---|---|---|---|
| 671,773 | 10/1963 | Canada | 260/327 |
| 882,110 | 11/1961 | Great Britain | 260/455 A |

OTHER PUBLICATIONS

Schuetz et al., " The Prep. & Desulfurization of Some . . . Thiiranes" (1960) J. Org. Chem. 26 pp. 3,467– 3,471 (1961)
Houben–Weyl– " Methodeu der Organischen Chemie" (1955) Georg Thieme Verlag–Stuttgart p. 166. (1955) QD 258 H7

*Primary Examiner*—Lewis Gotts
*Assistant Examiner*—G. Hollrah
*Attorney*—Richard L. Kelly, Carl A. Cline and Forrest D. Stine

[57] ABSTRACT

Allyl N,N-disubstituted thiocarbamates are manufactured by reacting a secondary amine with carbon disulfide and epichlorohydrin to yield a 2,3-epithiopropyl thiocarbamate, followed by desulfurization by heating or reaction with a desulfurizing reagent. The products are useful as pre-emergent herbicides.

2 Claims, No Drawings

METHOD OF MANUFACTURING ALLYL N,N-DIALKYLTHIOLCARBAMATES

DESCRIPTION OF THE INVENTION

This application is a continuation-in-part of U.S. Ser. No. 625,603, filed Mar. 24, 1967, now U.S. Pat. No. 3,510,290.

In the aforementioned application the following reaction outlined by structural formulas was disclosed:

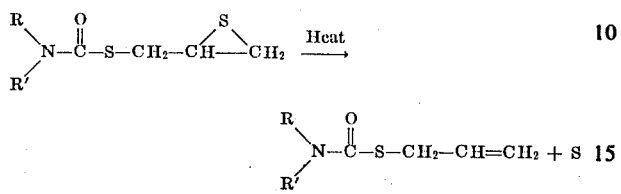

The thermal decomposition of the epithiopropyl thiocarbamates was disclosed to be an efficient and probably the most economical method of preparing allyl thiocarbamates. It has now been confirmed that the desulfurization of the 2,3-epithiopropyl structure may be economically accomplished by means of either heat or a suitable reagent and is applicable to synthesis of a broad class of allyl N,N-disubstituted thiocarbamates, some of which have not been previously made by any technique.

The allyl thiocarbamates as a class are compounds of established utility as disclosed, for example, in British Pat. No. 808,753.

The 2,3-epithiopropyl N,N-dialkyl-thiolcarbamates, which are the necessary intermediates, are prepared by two general methods, one a three-step process, with isolation of intermediates and the other essentially a single-step process.

METHOD A

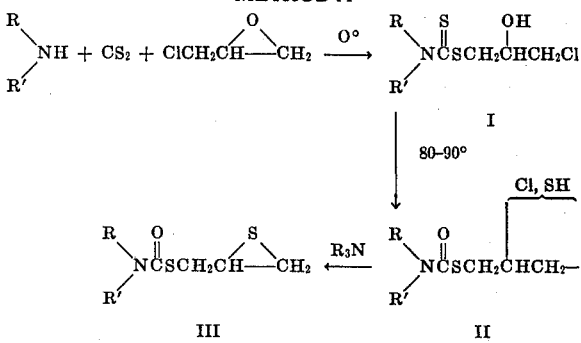

The initial low temperature reaction is believed to include reaction of epichlorohydrin with N,N-dialkyldithiocarbamic acid.

METHOD B

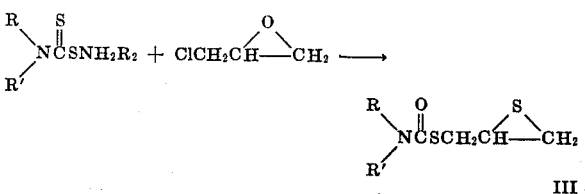

The reaction of epichlorohydrin with a salt (which may also be a metal salt, as well as an amine salt) appears to require a higher temperature than reaction with the acid.

In an experiment in which both routes were used to prepare the same N,N-diethylthiolcarbamate compound, the yields were roughly equivalent. In syntheses based on morpholine, dicyclohexylamine or isopropyl cyclohexylamine as starting materials, Method B has been found to be the only successful route, with the dithiocarbamate salt being the sole product obtained in the first step of Method A, rather than the more reactive free acid.

Intermediates I and II are isolable, though not easily purified. I is thermally unstable, rearranging to II in a matter of several hours to several days, depending on the nature of the N substituents.

The success of this sequence of reactions leading to a thiolcarbamate apparently requires a secondary amine as starting material. In three instances in which a primary amine was used the crude products decomposed extensively and no epithiopropyl thiolcarbamate (III), was obtained. In one experiment starting with tert.-butyl amine, tert.-butyl isothiocyanate was found among the products of decomposition.

The final products (III) of the sequence are distillable liquids or crystalline solids. Some care must be exercised to prevent excessive heating during distillation. Otherwise the following decomposition may occur prematurely:

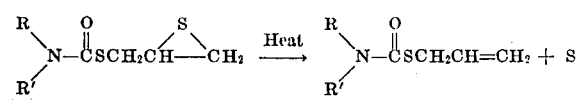

This thermal decomposition, if desired, may be used as an efficient and economical method of preparing allyl thiolcarbamates. However, the use of a desulfurizing reagent of the type employed to convert thioepoxides to olefins may facilitate separation and purification of the final product and for this reason is often more desirable. An illustrative example of these reagents is triphenylphosphine, which reacts as follows:

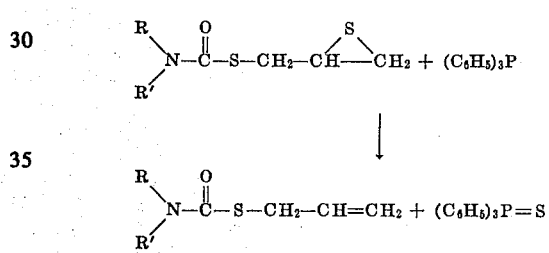

This reagent is a particularly good choice because the triphenylphosphine sulfide is a crystalline precipitate which may be easily removed by filtration. For additional information on desulfurizing reagents, see Chem. Rev. v. 66 p. 325–326 (1966). Illustrative procedures for manufacture of the 2,3-epithiopropyl compounds and desulfurization to the corresponding allyl ester appear below:

I Synthesis of a 2,3-Epithiopropyl Thiocarbamate

METHOD A

To a well-stirred mixture of 38.0 g. (0.5 mol) of carbon disulfide and 46.3 g. (0.5 mol) of epichlorohydrin in an ice-salt bath is added 36.5 g. (0.5 mol) of anhydrous diethylamine during 1 – 2 hours at 0° to −5°. The mixture is stirred an additional 30 minutes, then let warm slowly to room temperature. At this point the reaction mixture is essentially 3-chloro-2-hydroxypropyl N,N-diethyldithiocarbamate, (I; R,R' = Et), a viscous yellow oil with no detectable unreacted starting materials present.

Heating of the reaction mixture for 2 hours at 80° −90° under vacuum gives 110 g. of crude rearrangement product II (R,R' = Et). The course of the rearrangement may be easily followed by the disappearance of infrared absorption bands at 2.95$\mu$ (OH) and 10.15$\mu$ (C = S) with the appearance of bands at 3.92$\mu$ (SH) and 6.0$\mu$ (C = O). The rearrangement is also accompanied by a marked decrease in viscosity.

To 29 g. (0.12 mol of the crude rearranged product in 100 ml. of ether is added slowly 12 g. (0.12 mols) of triethylamine. Reaction is immediate, causing the ether to reflux gently and precipitating 10.8 g. of triethylamine hydrochloride. The solution is filtered, evaporated and vacuum distilled, giving 15.1 g. (61.4 percent yield overall) of 2,3-epithiopropyl N,N-diethylthiolcarbamate (III; R,R' = Et), $b_{0.2}$ 119° – 120°.

METHOD B

A solution of 36 g. (0.173 mol) of diethylammonium diethyldithiocarbamate and 15.0 g. (0.162 mols) of epichlorohydrin in 100 ml. of dioxane is heated to reflux. Shortly after heating is begun, a crystalline precipitate appears. After two hours, the solution is cooled and filtered to recover 15.4 g. of diethylamine hydrochloride. The filtrate is vacuum distilled to remove the bulk of the solvent, leaving 33.2 g. of a viscous brown oil. Extraction of this oil with ether, decantation and evaporation of the ether gives 25.7 g. of residue, distillation of which gives 17.7 g. of III, R,R' = Et.

II Desulfurization of the 2,3-Epithiopropyl Thiocarbamate

A. Thermal Desulfurization of 2,3-Epithiopropyl N-Cyclopentyl-N-Methyl-thiolcarbamate Crude 2,3-epithiopropyl N-cyclopentyl-N-methyl thiolcarbamate (90 g) was distilled at 1–2 mm pressure from an oil bath which was slowly heated from 160° to 210°. The fraction (36.4 g) boiling at 120°–145° was redistilled to give 14.0 g of pure allyl N-cyclopentyl N-methylthiolcarbamate, b.p. 102°–104°/0.15 mm.

B. Desulfurization of 2,3-Epithiopropyl N,N-Dipropyl Thiolcarbamate Using Trimethyl Phosphite A mixture of 23.3 g (0.1 mol) of 2,3-epithiopropyl N,N-dipropylthiolcarbamate and 37.2 g (0.3 mol) of trimethyl phosphite was heated 3 hours at 100°–110°and stripped in a rotary evaporator at aspirator vacuum, leaving 18.7 g. of residual oil, distillation of which gave 11.0 g of allyl N,N-dipropyl thiolcarbamate, b.p. 91°–92°/.012 mm.

C. Desulfurization of 2,3-Epithiopropyl N,N-Diisopropyl Thiolcarbamate Using Triphenyl Phosphine A solution of 46.6 g (0.2 mol) of 2,3-epithiopropyl N,N-diisopropylthiocarbamate and 52.4 g (0.2 mol) of triphenyl phosphine in 400 ml of ether was heated on the steam bath to boil off the ether and for an additional 2 hours during which time a crystalline solid (triphenyl phosphine sulfide) precipitated. The slurry was diluted with hexane, filtered and the filtrate distilled to give 28 g of allyl N,N-diisopropylthiolcarbamate, b.p. 88°–92°10.1 mm.

In Table I are listed the physical properties of the compounds produced by the method of this invention.

TABLE I

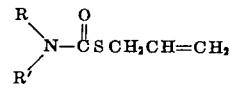

| R | R' | B.P./mm. | Calc'd C | Calc'd H | Calc'd N | Found C | Found H | Found N |
|---|---|---|---|---|---|---|---|---|
| $CH_3$ | $CH_3$ | 55–8°/0.05 | Known compound | | | | | |
| $C_2H_5$ | $C_2H_5$ | 76–8°/0.1 | Known compound | | | | | |
| $nC_3H_7$ | $nC_3H_7$ | 91–2°/0.12 | Known compound | | | | | |
| $nC_4H_9$ | $C_2H_5$ | 79–83°/0.1 | Known compound | | | | | |
| Cyclo $C_6H_{11}$ | $C_2H_5$ | 119–23°/0.1 | Known compound | | | | | |
| $iC_3H_7$ | $iC_3H_7$ | 88–92°/0.1 | 59.80 | 9.49 | 6.98 | 59.89 | 9.57 | 6.91 |
| Cyclo $C_5H_9$ | $CH_3$ | 102–4°/0.15 | 60.26 | 8.60 | 7.03 | 60.28 | 8.47 | 6.95 |
| $PhCH_2$ | $iC_3H_7$ | 159–63°/0.75 | 67.43 | 7.68 | 5.62 | 67.72 | 8.03 | 6.55 |
| —$CH(CH_3)CH_2CH_2CH(CH_3)$— | | 98–101°/0.1 | 60.26 | 8.60 | 7.03 | 59.68 | 9.03 | 7.18 |

III. Herbicidal Use

Pre-emergent herbicidal activity was evaluated by means of the following procedure:

A solution was prepared by dissolving 290 mg. of the compound to be tested in 200 ml. of acetone. Disposable expanded polystyrene trays about one foot square and three inches deep were prepared and seeded, then sprayed with the acetone solution at the rate of 10 pounds of active chemical per acre of sprayed area. The seeds were then covered with about one-fourth inch of soil. One tray, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the trays were examined and plant emergence and effects on growth were rated according to the schedule set forth below.

| | Type of Action | Degree | |
|---|---|---|---|
| C = | chlorosis (bleaching) | 0= | no effect |
| N = | necrosis | 1= | slight effect |
| G = | growth inhibition | 2 = | moderate effect |
| F = | formative effect (abnormal form of growth) | 3= | severe effect |
| K = | non-emergence | 4= | maximum effect (all plants died) |

Following are tabulated the results of tests according to the above procedures on a representative group of thiolcarbamates.

PRE-EMERGENT HERBICIDAL ACTIVITY

Compound $$\begin{array}{c} R \\ \phantom{R}\diagdown \\ \phantom{RR}N-C-S-CH_2CH=CH_2 \\ \phantom{R}\diagup \\ R_1 \end{array}$$

| R | R' | Crab-grass | Cox-comb | Brome | Millet | Soy-bean | Cotton | Alfalfa | Oats | Corn | Flax | Radish | Sugar Beet |
|---|---|---|---|---|---|---|---|---|---|---|---|---|---|
| Methyl | Methyl | 1 | 0 | 1 | 2 | 0 | 0 | 0 | 3 | 0 | 0 | 0 | 0 |
| Ethyl | Ethyl | 3 | 0 | 4 | 3 | 3 | 3 | 1 | 4 | 2 | 0 | 1 | 0 |
| Propyl | Propyl | 3 | 1 | 4 | 3 | 3 | 3 | 2 | 4 | 3 | 3 | 3 | 2 |
| Butyl | Ethyl | 3 | 0 | 4 | 3 | 2 | 2 | 2 | 4 | 3 | 1 | 1 | 0 |
| Cyclohexyl | do | 4 | 3 | 4 | 3 | 3 | 2 | 1 | 4 | 0 | 1 | 0 | 1 |
| Isopropyl | Isopropyl | 3 | 0 | 4 | 3 | 3 | 0 | 1 | 4 | 1 | 0 | 0 | 0 |
| Cyclopentyl | Methyl | 3 | 4 | 4 | 3 | 3 | 3 | 1 | 4 | 0 | 3 | 3 | 3 |
| Benzyl | Isopropyl | 3 | 3 | 4 | 2 | 1 | 1 | 4 | 3 | 1 | 1 | 4 | 4 |

$$\begin{array}{c} R \\ \phantom{R}\diagdown \\ \phantom{RR}N- \\ \phantom{R}\diagup \\ R' \end{array}$$

| | Crab-grass | Cox-comb | Brome | Millet | Soy-bean | Cotton | Alfalfa | Oats | Corn | Flax | Radish | Sugar Beet |
|---|---|---|---|---|---|---|---|---|---|---|---|---|
| 2,5-dimethylpyrrolidinyl | 2 | 0 | 2 | 3 | 0 | 0 | 1 | 2 | 0 | 0 | 0 | 0 |

I claim:

1. The method of manufacturing an allyl N,N-disubstituted thiocarbamate comprising the steps, a. reacting a secondary amine selected from the group consisting of lower alkyl, lower cycloalkyl and benzyl substituted secondary amines with carbon disulfide and epichlorohydrin at a low temperature, heating the reaction product to effect a rearrangement and reacting the rearranged product with a tertiary amine to yield a 2,3-epithiopropyl N,N-disubstituted thiocarbamate, and b. heating or reacting the 2,3-epithiopropyl N,N-disubstituted thiocarbamate with a desulfurizing reagent to a degree sufficient to effect the removal of sulfur and the formation of an allyl N,N-disubstituted thiocarbamate.

2. The method of allyl N,N-diethylthiocarbamate comprising the steps, a. reacting diethylammonium diethyldithiocarbamate with epichlorohydrin to yield 2,3-epithiopropyl N,N-diethylthiocarbamate, b. heating 2,3-epithiopropyl N,N-diethylthiocarbamate to liberate sulfur and form a reaction product containing allyl N,N-diethylthiocarbamate, and c. separating the allyl N,N-diethylthiocarbamate from the reaction mixture by distillation.

* * * * *